United States Patent
Fries et al.

(10) Patent No.: US 10,528,976 B1
(45) Date of Patent: Jan. 7, 2020

(54) EMAIL COMPLIANCE SYSTEMS AND METHODS

(71) Applicant: OpenMail LLC, Venice Beach, CA (US)

(72) Inventors: John Andrew Fries, Los Angeles, CA (US); Erik Ahern Price, Los Angeles, CA (US); Sanjeev M. Rao, Manhattan Beach, CA (US)

(73) Assignee: OpenMail LLC, Venice Beach, CA (US)

( * ) Notice: Subject to any disclaimer, the term of this patent is extended or adjusted under 35 U.S.C. 154(b) by 742 days.

(21) Appl. No.: 15/050,113

(22) Filed: Feb. 22, 2016

(51) Int. Cl.
G06Q 30/00 (2012.01)
G06Q 30/02 (2012.01)
H04L 29/08 (2006.01)
H04L 12/58 (2006.01)

(52) U.S. Cl.
CPC ..... *G06Q 30/0255* (2013.01); *G06Q 30/0269* (2013.01); *G06Q 30/0277* (2013.01); *H04L 51/22* (2013.01); *H04L 67/02* (2013.01); *H04L 67/04* (2013.01)

(58) Field of Classification Search
None
See application file for complete search history.

(56) References Cited

U.S. PATENT DOCUMENTS

| | | | | |
|---|---|---|---|---|
| 7,240,360 B1 * | 7/2007 | Phan | ...................... | G06F 21/82 726/2 |
| 8,751,298 B1 * | 6/2014 | Giordano | ........... | G06Q 30/0233 705/14.26 |
| 9,204,251 B1 * | 12/2015 | Mendelson | .............. | G08G 1/14 |
| 9,213,675 B1 * | 12/2015 | Kolton | ..................... | H04W 4/21 |
| 2003/0163427 A1 * | 8/2003 | Fung | ...................... | G06Q 30/02 705/51 |
| 2004/0033777 A1 * | 2/2004 | Farineau | ................ | H04H 60/46 455/3.02 |
| 2007/0027864 A1 * | 2/2007 | Collins | .............. | G06Q 30/0211 |
| 2008/0133373 A1 * | 6/2008 | Perdomo | ................ | G06Q 20/20 705/18 |

(Continued)

OTHER PUBLICATIONS

Jakobsson; How Things Work and Fail; 2012; John Wiley & Sons; pp. 57-167; 2012.*

(Continued)

*Primary Examiner* — Luis A Brown
*Assistant Examiner* — Radu Andrei
(74) *Attorney, Agent, or Firm* — Schwegman Lundberg & Woessner, P.A.

(57) ABSTRACT

Online advertisers may demand compliance with certain standards for the content of emails and other digital content with which its advertisements may be associated. Emails may contain control objects directing users to a web page showing content related to oil change coupons. However, in some systems, methods, and processes, a small variable proportion of users may instead be directed to a different sequence of pages to conduct a compliance check on the contents of the email received by the user. The compliance check sequence of pages may offer the user an incentive to forward the email to a specified email address for subsequent compliance review. Delivery of an incentive may be conditioned on successful receipt of the forwarded email.

26 Claims, 4 Drawing Sheets

(56) References Cited

U.S. PATENT DOCUMENTS

| | | | | |
|---|---|---|---|---|
| 2008/0282079 | A1* | 11/2008 | Yaghmour | H04L 9/00 713/150 |
| 2008/0313287 | A1* | 12/2008 | Wadsworth | G06Q 10/107 709/206 |
| 2011/0011931 | A1* | 1/2011 | Farley | G06Q 20/20 235/382.5 |
| 2011/0099068 | A1* | 4/2011 | Takano | G06Q 30/02 705/14.54 |
| 2011/0276590 | A1* | 11/2011 | Hayes | G06Q 10/107 707/769 |
| 2013/0035081 | A1* | 2/2013 | Sanger | G06K 9/228 455/414.2 |
| 2013/0282458 | A1* | 10/2013 | Roberts | G06Q 30/0201 705/14.19 |
| 2014/0130162 | A1* | 5/2014 | Kim | H04L 63/1483 726/23 |
| 2014/0164560 | A1* | 6/2014 | Ko | H04L 67/02 709/217 |
| 2014/0244386 | A1* | 8/2014 | Mathur | G06Q 30/0255 705/14.53 |
| 2014/0274135 | A1* | 9/2014 | Edge | H04W 4/021 455/456.2 |
| 2014/0279014 | A1* | 9/2014 | Roka | G06O 30/0261 705/14.58 |
| 2015/0006243 | A1* | 1/2015 | Yuasa | G06Q 30/0201 705/7.29 |
| 2015/0088676 | A1* | 3/2015 | Elliott | G06Q 20/202 705/21 |
| 2015/0149313 | A1* | 5/2015 | Bacher | G06Q 20/425 705/24 |
| 2015/0186908 | A1* | 7/2015 | Taskin | G06Q 30/0204 705/7.33 |
| 2015/0220934 | A1* | 8/2015 | Chauhan | G06Q 30/012 705/17 |
| 2015/0304295 | A1* | 10/2015 | Chiba | G06F 21/335 726/4 |
| 2015/0332258 | A1* | 11/2015 | Kurabi | G06Q 20/401 705/71 |
| 2015/0356660 | A1* | 12/2015 | L'Heureux | G06Q 30/0631 705/14.53 |
| 2015/0356668 | A1* | 12/2015 | L'Heureux | G06Q 30/0641 705/27.1 |
| 2016/0071115 | A1* | 3/2016 | Oh | G06Q 20/202 705/7.29 |
| 2016/0292707 | A1* | 10/2016 | Blandin | G06Q 50/30 |

OTHER PUBLICATIONS

Paun; Prompting Influencil Users to Promote Content; ip.com; May 15, 2014.*

* cited by examiner

EMAIL COMPLIANCE SYSTEMS AND METHODS

TECHNICAL FIELD

This application generally relates to online advertising systems and more particularly, but not by way of limitation, to systems and methods for assessing compliance with email advertising policies.

BACKGROUND

Advertisers generally have content policies, standards, guidelines, or requirements that advertising copy and creative content must comply with in order to be paid for by advertisers. In general, such policies may seek to prevent or discourage misleading advertisements, to maintain particular aesthetic standards, to maintain brand identity, to increase efficiency of advertisement expenses, or to achieve various other objectives.

Such standards may extend to online advertisement copy and/or creative content produced by third parties who may act as intermediaries between advertisers and members of an advertisement audience. Some online advertisement ecosystems may include multiple layers of such third party content creators who may perform various activities in attempts to connect audience members with relevant advertisements. Various other entities within such an ecosystem, such as platform services or advertising networks may also have advertisement content policies.

Some online advertisement ecosystems may involve highly complex chains of content-creating and/or content-distributing entities between an advertiser and audience members. As a result, substantial challenges arise in ensuring that all members of the ecosystem comply with all applicable content standards.

SUMMARY

In some aspects, the present disclosure provides an advertisement email compliance method comprising: receiving a first electronic request from a first user device for a first advertisement content, the advertisement content corresponding to a first session URL; assigning a first session identifier to the user device, the session identifier uniquely identifying a session initiated by the first electronic request; storing first digital data in a server log, the first digital data comprising a first session URL from the first electronic request and the first session identifier; generating a first email address containing a first email identifier and associating the first email identifier with the first session identifier; and presenting the user device with compliance test content instead of the requested first advertisement content, the compliance test content including a presentation of the generated first email address.

In some aspects, the advertisement email compliance method may further include: receiving a compliance email message at the generated first email address; obtaining the first session identifier from a portion of a recipient email address in a header of the received compliance email message; using the first session identifier to retrieve the first session URL from the server log; searching the compliance email message for a string matching the session URL; and if a string matching the session URL is found in the received compliance email message, forwarding the compliance email message to a compliance evaluation email address.

In some aspects of an advertisement email compliance method, the session URL in the received compliance email message is contained in a hyperlink. In some aspects, the string matching the session URL is an inexact match.

In some aspects, the advertisement email compliance method may further include receiving the forwarded compliance email message at the compliance evaluation email address, and automatically comparing content of the forwarded compliance email message with an approved email template.

In some aspects, the advertisement email compliance method may further include sending a success message to a user device if a string matching the session URL is found in the received compliance email message. In some aspects, the advertisement email compliance method may further include sending a failure message to a user device if a string matching the session URL is not found in the received compliance email message.

In some aspects, the advertisement email compliance method may further include identifying an advertisement campaign associated with the requested URL and storing data associating the advertisement campaign with the session URL.

In some aspects, the advertisement email compliance method may further include storing second digital data associating the generated email address with the session identifier;

In some aspects, the advertisement email compliance method may further include identifying an advertising campaign associated with the session URL, obtaining a test rate associated with the campaign, and directing the first user device to the compliance test content based on the test rate.

In some aspects of an advertisement email compliance method, the electronic request may be an HTTP request. In some aspects, the electronic request may be a WAP request. In some aspects, presentation of the generated first email address comprises displaying the generated first email address as text. In some aspects, presentation of the generated first email address comprises providing the generated first email address in a control object. In some aspects, the session identifier uniquely identifies the session initiated by the first electronic request.

In another aspect, the present disclosure provides a method of verifying a compliance email, comprising: receiving an email message; obtaining, from the email message, a generated email address to which the email message was sent; obtaining a first session identifier from a portion of the generated email address in a header of the received compliance email message; using the first session identifier to retrieve a session URL from a server log; searching the received email message for a string matching the session URL; if a string matching the session URL is found in the received email message, forwarding the received email message to a compliance evaluation email address.

In some aspects of the method of verifying a compliance email, the session URL in the received email message is contained in a hyperlink. In some aspects, the string matching the session URL is an inexact match.

In some aspects, the method of verifying a compliance email may further include receiving the forwarded email message at the compliance evaluation email address, and automatically comparing content of the forwarded compliance email with an approved email template.

In some aspects, the method of verifying a compliance email may further include sending a success message to a user device if a string matching the session URL is found in the received email message.

In some aspects, the method of verifying a compliance email may further include sending an incentive fulfillment instruction to a request server.

In some aspects, the method of verifying a compliance email may further include sending a failure message to a user device if a string matching the session URL is not found in the received email message.

In another aspect, the present disclosure provides an email compliance testing system comprising: at least one processor; at least one data storage device with a plurality of storage sections; a first storage section of the at least one data storage device having email compliance testing process instructions stored therein, wherein the email compliance testing process instructions, when executed by the at least one processor, configure the at least one processor to: receive a first electronic request from a first user device for a first advertisement content, the advertisement content corresponding to a first session URL; assign a first session identifier to the user device, the session identifier identifying a session initiated by the first electronic request; store first digital data in a server log, the first digital data comprising a first session URL from the first electronic request and the first session identifier; generate a first email address containing a first email identifier and associate the first email identifier with the first session identifier; and present the user device with compliance test content instead of the requested first advertisement content, the compliance test content including a presentation of the generated first email address.

In some aspects, the email compliance testing system may further include a second storage section of the at least one data storage device having validity evaluation process instructions stored therein, wherein the validity evaluation process instructions, when executed by the at least one processor configure the at least one processor to: receive a compliance email message at the generated first email address; obtain the first session identifier from a portion of a recipient email address in a header of the received compliance email message; use the first session identifier to retrieve the first session URL from the server log; search the compliance email message for a string matching the session URL; and forward the compliance email message to a compliance evaluation email address if a string matching the session URL is found in the received compliance email message.

In some aspects of the email compliance testing system, the validity evaluation process instructions, when executed by the at least one processor further configure the at least one processor to send a success message to the user device if the string matching the session URL is found in the received compliance email message.

In some aspects of the email compliance testing system, the validity evaluation process instructions, when executed by the at least one processor further configure the at least one processor to send a failure message to the user device if the string matching the session URL is not found in the received compliance email message.

BRIEF DESCRIPTION OF THE DRAWINGS

Certain novel features are set forth with particularity in the claims that follow. A further understanding of some of the features and advantages of some embodiments will be obtained by reference to the following detailed description that sets forth illustrative embodiments, in which certain non-limiting principles are utilized, and the accompanying drawings of which:

DETAILED DESCRIPTION

The various embodiments will be described in detail with reference to the accompanying drawings. References made to particular examples and implementations are for illustrative purposes, and are not intended to limit the scope of the invention or the claims. Various features of the different disclosed embodiments can be combined to form further embodiments, which are part of this disclosure.

In an example advertising system, a mailer entity may operate a list of email addresses to which the mailer may send emails containing hyperlinks and/or other markup language (e.g., hypertext markup language or HTML) to digital content containing advertisements. In some cases, the mailer may prepare the emails such that users clicking hyperlinks in an email may be directed to digital content created and maintained by a partner entity. The digital content may also contain one or more elements controlled by a facilitator, which may maintain relationships with one or more advertising networks. The advertising network(s) may serve advertisements, provided by advertisers, to be displayed in the digital content to users who received an email from the mailer. Thus, in some example models, online traffic may flow from left-to-right between the entities Mailer→Partner→Facilitator→Ad Network→Advertiser. At the same time, revenue may flow from right-to-left between the same entities.

In some cases, the advertisers may demand compliance with certain standards for the content of emails and other digital content with which its advertisements may be associated. For example, the mailer and the partner may be instructed by the facilitator to send only emails complying with specified standards and to present compliant digital content to users. The compliance standards may be defined so as to prevent non-compliant emails or digital content from misleading the end user. For example, some non-compliant emails or other content may mislead users into clicking on CPC (cost per click) ads that end up making the advertiser angry because they are spending advertising dollars on clicks by users who have no intent to convert on a sale solely because they are being asked to click on an ad.

On the other hand, the entities to the left of the advertisers have decreasing interests in compliance with such standards and an increasing incentive to "cheat" in order to increase their share of revenue. For example, mailers may routinely push the envelope with respect to compliance with the advertisers' standards because non-compliance may be difficult to detect and more profitable than compliance. Additionally, compliance rules may change over time creating additional challenges to policing compliance by mailers. In some cases, a small amount of non-compliant traffic may be tolerable or inevitable because entities downstream of the mailer ultimately have to be practical in how they measure and enforce their policies. In the above example model, enforcement of the advertiser's policies may fall to entities earlier in the chain, such as the Facilitator.

In one example scenario, an end user may receive a newsletter email sent by a mailer entity. The newsletter may contain information about automotive care (as a non-limiting example), and may include a hyperlink that points to a campaign domain URL (for example, oilchangecouponsforfun.com/somecontent). Normally, when the user clicks on the hyperlink, he/she may be directed to a web page showing keywords or other content related to an advertisement subject (e.g., oil change coupons). However, in some embodiments of the systems, methods, and processes described herein, a small variable proportion of users may instead be directed to a different sequence of pages to conduct a compliance check on the contents of the email received by the user. For example, the sequence of pages may offer the user an incentive to forward the email to a specified email address for subsequent compliance review.

As used herein, the term "session URL" refers to a URL to which an initial request is sent by a user initiating a client-server interaction session that may lead to a compliance test as described herein.

In some embodiments, the proportion of users directed to a compliance test may be set to an initial baseline level which may be established based on an initial estimate of a proportion needed to obtain a representative sample of traffic directed to a particular session URL. In other cases, the initial baseline level may be an arbitrary quantity based on experience or other information. In various embodiments, the baseline level may be less than 1% up to 10% or more.

In various embodiments, the proportion of users directed to a compliance check may be increased from a baseline proportion for session URLs associated with a particular email campaign, or with a particular partner, mailer, facilitator, ad network, or advertiser. For example, if it is suspected that a particular mailer or partner is more likely to send non-compliant emails (e.g., if the particular mailer has been previously caught sending non-compliant emails, if an ad network operator or an advertiser complains about non-compliant emails), then the proportion of users directed to a compliance check may be increased relative to a baseline proportion.

In some cases, a proportion of users directed to a compliance check may be increased from a baseline proportion due to a detected increase in suspicion that traffic to a particular session URL purporting to have originated from an email did not, in fact, originate from an email.

However, increasing the proportion of users directed to a compliance check may tend to decrease revenue to all parties in the advertising system, because those users directed to a compliance check may not be immediately directed to an advertisement, and the cost of any incentives used to incentivize user participation would be subtracted from any revenue. In some cases, it may be desirable to decrease a proportion of users directed to a compliance check. For example, if a particular Mailer or Partner has demonstrated a history of compliant emails over the course of a period of days, months, years, etc. then the proportion of users directed to a compliance check may be decreased below a baseline level so as to increase revenue potential.

Figure 1:
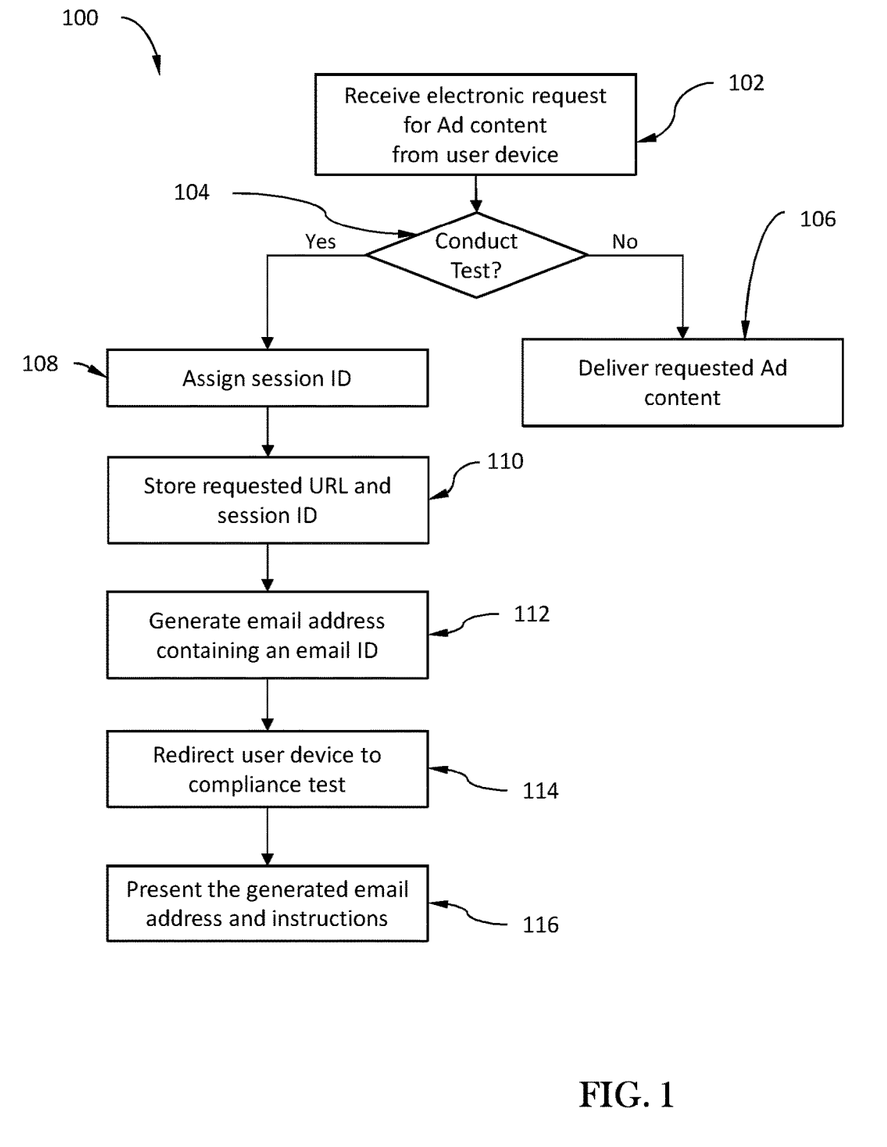
FIG. 1 is a process flow diagram illustrating an example process for initiating a compliance testing process.

FIG. 1 illustrates an example embodiment of a process for testing an advertising email for compliance with content policies. The process 100 may begin when a request for advertising content is received at block 102. The request may be received over a network communication system from a user device. As indicated at block 104, the process 100 may determine whether or not the user device from which the request was received should be directed to a compliance test. If the process at block 104 determines that the user device should not be directed to a compliance test, the process may deliver the requested content to the user device in response to the request received at block 102.

If the process at block 104 determines that the user device should be directed to a compliance test, then the process may assign a session identifier at block 108, and may store the session identifier along with a session URL (uniform resource locator) in a server log at block 110. The session URL stored in the server log may be the initial request URL contained in the request received at block 102. In various embodiments, additional data associated with the session may be stored in the server log along with the session identifier and the session URL. Such additional information may include an IP address of the requesting user device, a user agent string associated with the request, a cookie or other persistent identifier (e.g., a "Flash cookie," a local shared object, or a similar data object), a referrer URL, and/or other information from an HTTP header of a request.

At block 112, the process 100 may generate an email address containing a unique email identifier at block 112. The process may also redirect the user device to a compliance test content at block 114. The generated email address may be presented to the user device along with the compliance test content in block 116. As also indicated at block 116, the compliance test content may also present information and instructions, such as instructions directing the user to forward the email containing the hyperlink that led them to the compliance test content to the generated email address.

Email messages sent by mailers may contain any number of URLs or hyperlinks containing URLs. The one or more URLs, when followed (e.g., activated by a click, touch or other user-initiated or automated action) may cause the user device to send a request to the URL for one or more resources which may include advertising content.

As used herein, the term "email message" may refer to any digital message transmitted from a sender to one or more recipients over a computer network (e.g., the Internet) via any number of network-connected servers and one or more addressing systems, transmission protocols, and/or retrieval protocols. An email message may generally include a message header and a message body. The email message header may contain control information such as an originator's email address and one or more recipient addresses. The email header may also include descriptive information such as a subject header field and a message submission date/time stamp. The email message body may include text, images, hyperlinks, and/or other elements.

As used herein, the term "email address" may refer to a text string identifying a recipient or a sender of an email message. An email address may generally be made up of two parts, an addressee part and a domain part separated by an "@" symbol. The addressee portion of an email address may include any combination of alphabetic characters, numeric characters, or any other characters recognized by an email delivery system. The domain part may include a domain name, an optional subdomain name, and a top-level domain (TLD) identifier such as ".com", ".biz", ".us", etc. For example, a valid email address may be "addressee123@subdomain.domain.TLD".

Email messages sent in the systems and methods described herein may contain one or more control elements, such as text elements, image elements, video elements, multimedia elements, or other media detectable by a user via a user device. Control elements may be visible, audible, or tactile sensible to a user operating a user device. The control elements may also be associated with one or more hyperlinks or other mechanisms for automating the sending of a request for advertising content. User devices may comprise smart phones, smart watches, tablets, laptop computers, desktop computers, hybrid devices, or any other network-connected computing device or combination of devices.

Figure 2:
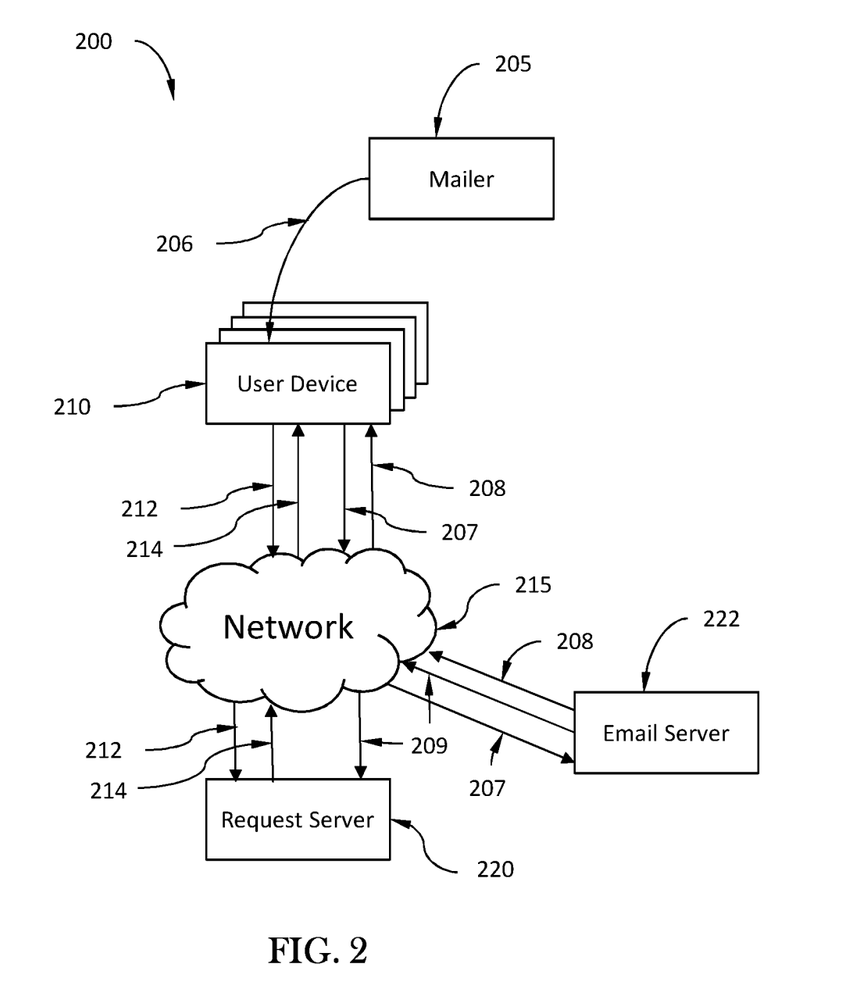
FIG. 2 is a block diagram illustrating an email compliance testing system that may be used to perform a compliance testing process and/or an email confirmation process.
Figure 3:
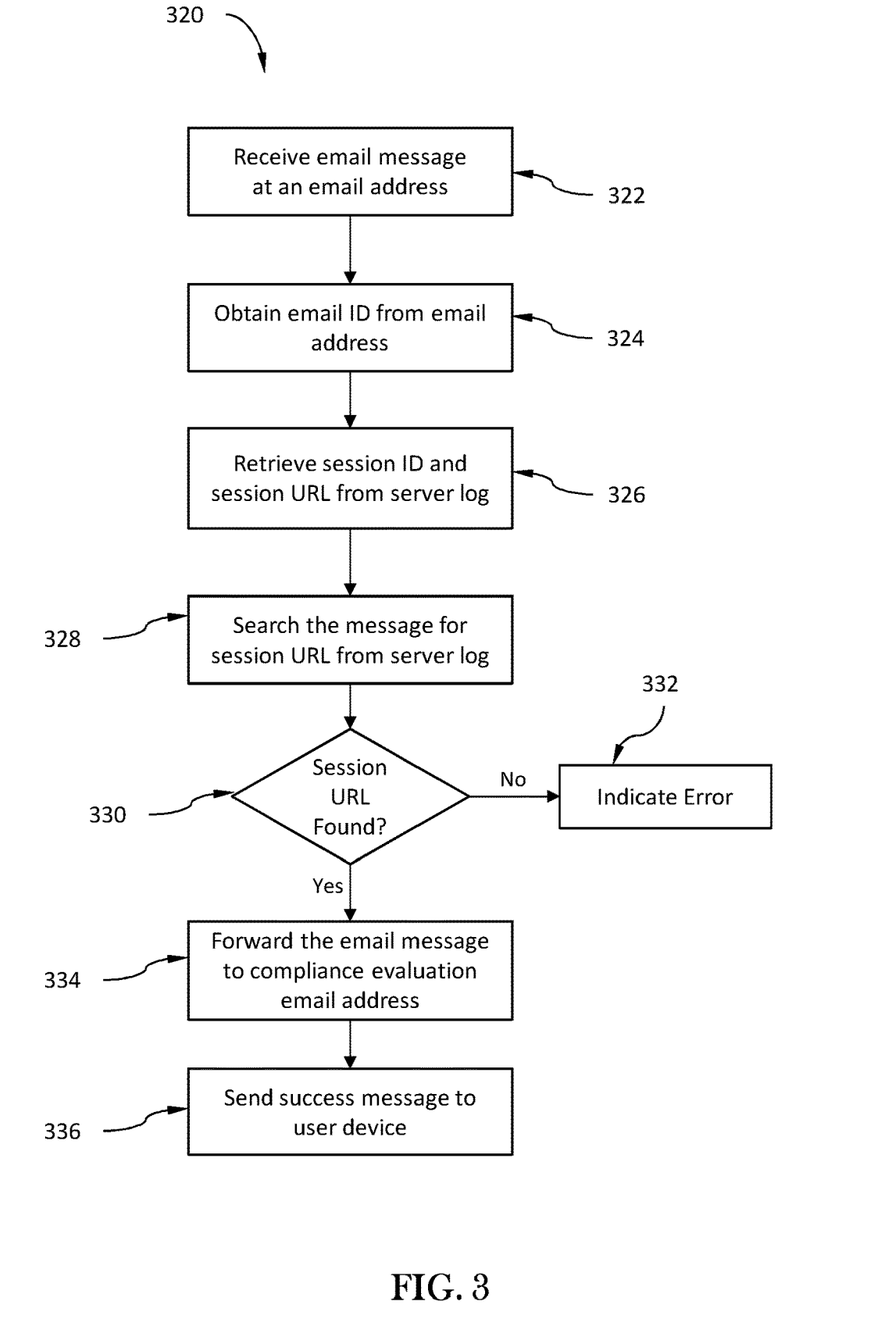
FIG. 3 is a process flow diagram illustrating an example process for confirming an email in a compliance testing process.

FIG. 2 provides a block diagram illustration of an email compliance testing system 200 that may be used to perform the process 100 of FIG. 1 and/or the process 320 of FIG. 3. A mailer 205 may transmit email messages 206 to a plurality of email addresses associated with any number of users who may receive the email messages 206 using one or more user devices 210. In some embodiments, a user who receives an email message from a mailer 205 may activate a control element in the email message with a user device 210, for example by clicking or tapping a text element or a graphic element containing a hyperlink. Once activated, the control element may cause the user device 210 to send an electronic request 212 for ad content over a network 215 to a request server 220 reached at a session URL. The request server 210 may respond to the electronic request (and subsequent requests) by sending response data 214 to the user device 210 over the network.

In various embodiments, the mailer 205 may comprise any number of computing devices (e.g., personal computing devices, servers, or others). The user device 210 may comprise a single device or a plurality of devices operated by a single user. In the case of multiple devices operated by one user, in some embodiments a single client-server session state may be maintained across any two or more devices. The system 200 may involve any number of user devices operated by any number of users.

As used herein, the term "uniform resource locator" and its abbreviation "URL" refer to any identifier indicating content being requested by an electronic request. As used herein, the term "request URL" refers to a uniform resource locator contained in an electronic request for content sent by a user device and received by a request server. As used herein, the term "session URL" refers to an initial request URL associated with a specific session that may be uniquely identified by a session identifier (or "session ID"). Thus, for example, in the case of an HTTP request, a request URL contained in the request sent from the user device 210 to the request server 220 may include a text string address identifying an IP address, a subdomain, and/or a domain name identifying the request server. A request URL and/or the session URLmay also contain text identifying one or more directories, sub-directories, or other parameters that may be used by the request server to identify and/or specify content being requested. In some embodiments, the session URL is the URL in an email message that, when followed by a user, leads the user device to initiate a session with the request server.

In some embodiments, an electronic request for ad content may comprise a request according to hypertext transfer protocol (HTTP) standards, wireless access protocol (WAP) standards, email protocols, short message service (SMS) protocols, or any other wired or wireless data transmission protocols. In general, an electronic request for ad content may include an identifier (e.g., a string of alphanumeric characters) indicating the specific ad content being requested.

The electronic request may also include a header (e.g., an HTTP header) identifying the user device from which the request was sent. For example, the electronic request may include an IP address, a MAC (media access control) address, IMEI (international mobile station equipment identity), an indication of the operating system and/or application from which the request originated, and/or other information.

As used herein, the terms "advertisement content", "advertising content", and "ad content" may include any combination of text, graphics, audio, video, multi-media, or other human-perceptible elements to be presented to a user or other individual or group audience via the user device from which an electronic request is sent. In some embodiments, advertising content may include a web page containing text and/or other content, and may include one or more hyperlinks configured to direct a web browser or other software to transmit a request to a network address for additional specified content (such as a separate web page, or content to be loaded in a first web page). In other embodiments, ad content may include a banner advertisement embedded in or displayed along with a game or other application running on the user device.

Upon receiving a particular electronic request for ad content from a user device 210, the request server 220 may determine whether or not to direct that user device 210 to a compliance testing process. For example, in some embodiments, the request server 220 may be configured to initiate a compliance test for every X requests, where X may be any integer. In some embodiments, the request server 220 may be configured to initiate a compliance test for a pre-determined percent of users (e.g., a baseline proportion), and may be further configured to randomly select individual sessions for compliance testing. As described above, the proportion of users (or sessions) directed to a compliance test may be increased or decreased based on several factors.

When the request server 220 determines that a particular user device session should be directed to a compliance testing process, the request server 220 may assign a session ID to the session initiated by the request. The session ID may comprise any numeric, alphabetical, alphanumeric, or other string of characters uniquely identifying the session initiated by the request.

As used herein, the term "session" may refer to a semi-permanent interactive information interchange between one or more user devices and a request server. In some embodiments, a session may be initiated by a first request sent to a request server from a user device based on a user interaction with an email received on the user device. A session initiated by a first request may be maintained in a stateless protocol (e.g., HTTP) by use of any suitable mechanism, such as browser cookies, Flash cookies, device fingerprinting techniques, or any other mechanism.

In some embodiments, additional unique identifiers (abbreviated "ID" herein) may be assigned by the request server (or another server) and associated with the session ID in a server log or other data store. For example, each specific user device may be assigned a device ID based on a unique cookie or other persistent identifier or based on a device fingerprint. Each unique user may be assigned a unique user ID based on a cookie or other available unique information (e.g., an email address or login name). In some cases, a unique event ID may be assigned when specific events occur, such as a search, an ad-click or other events that may be desirable to track individually. In some embodiments, any of the IDs described herein may be non-unique IDs, which may be used in combination with other unique or non-unique IDs for uniquely identifying associated data or information.

The request server 220 may store log data including the session ID, the request URL as a session URL, and any other data as desired (e.g., date and time of the request, details of the user device 210 contained in the request, additional details about the requested ad content, or other data).

The request server 220 may generate an email address containing an email ID. In some embodiments, the email ID may be identical to the session ID. In some embodiments, the email ID may contain all of the session ID or a portion of the session ID along with additional characters. In some embodiments, the email ID may include any other string of characters selected to uniquely identify the email address associated with an assigned session ID. In various embodiments, the email ID may be contained in one or more of the addressee portion, the domain, or a subdomain portion of the email address. In some embodiments, the email address may comprise a concatenation of an email ID, an associated session ID, and/or other data such as a campaign identifier, a user identifier, a user device identifier, a partner identifier, a mailer identifier, or other information.

In some embodiments, generated email addresses may be created as aliases or forwarding addresses that may be configured to forward emails to an email address or inbox other than the one to which the email is directly addressed. A plurality of generated email addresses forwarding emails to a common inbox may be described as "grouped" or as "a group." In some embodiments, generated email addresses may be grouped based on a common characteristic shared by the sessions for which the email addresses are generated. For example, generated email addresses may be grouped by a common campaign, a common advertiser, a common set of unique compliance rules, a common mailer, a common partner, or by other criteria.

In some embodiments, the request server 220 may associate the email identifier with the session identifier by storing data in a data store creating a one-to-one relationship between the session ID and the email ID. In other embodiments, the request server 220 may associate the email ID with the session ID by including both identifiers in the generated email address. In other embodiments, a single identifier may be used as both the email ID and the session ID as described herein.

In some embodiments, a single unique generated email address may be presented to multiple users. In such embodiments, an IP address from which a compliance email is forwarded (or other information identifying a user or user device) may be identified and matched with an IP address (or other identifying information) associated with one of a plurality of browsing sessions in which the generated email address was presented.

In various embodiments, the request server 220 may present the user device 210 with the compliance test content by replying to the request with digital content containing the compliance test content. The compliance test content may include the generated email address and instructions for how the user may participate in the compliance test. In some embodiments, the reply with the compliance test content may comprise redirecting the user to a different web page, web site, URL, domain, sub-domain, or other network-connected data resource. In various embodiments, the generated email may be presented as plain text, or as a hyperlink or other control object associated with a text, graphic, or other digital object included in the compliance test content. A control object may generally include any digital object presented to a user as part of the compliance test content (or other content) with which a user may interact, such as by clicking, touching, speaking, typing, or otherwise.

In some embodiments, the compliance test content may include one or more survey questions designed to assess whether the particular user is an acceptable candidate for the compliance test. For example, in one embodiment, the compliance test content may include a question such as "Did you get here from an email?" In such a case, the compliance test content may also include one or more digital controls allowing the user to answer the question in a "yes" or "no" manner.

The compliance test content may also include instructions stating that, if an email did lead the user to the compliance test content, then the user may forward the email message to the generated email address. In various embodiments, survey questions, answer options, and the generated email address may be presented to the user device in the form of interactive controls, as plain text, or as a combination of both.

For example, in one embodiment, providing the generated email address to the user device may include sending digital data defining a web page to the user device, the web page containing an object with the generated email address as plain text and/or as a hyperlink. The user may copy the email address using a copy/paste operation in the user device.

In some embodiments, the compliance test content may also include an offer of an incentive for following through with the compliance test (e.g., forwarding the original email). For example, an offered incentive may include entry in a drawing to win cash or an item of value. In some embodiments, the offer of an incentive may be conditioned upon successful completion of the user's email forwarding task.

A user may forward email an message 207 to a generated email address. An email server 222 may be configured to receive email messages sent to one or more generated email addresses, and may contain instructions for performing other processes with the received emails, such as processes for analyzing or evaluating received email messages or processes for forwarding email messages for further downstream evaluation.

In some embodiments, an email confirmation process running on an email server 222 (or an associated server such as the request server 220) may evaluate email messages sent to generated email addresses to determine whether they are valid email messages forwarded from users participating in a compliance test. Depending on the outcome of a validity evaluation process configured to determine whether a submitted (forwarded) email message 207 successfully completes a compliance test, a process running on the email confirmation server 222 may send a success/failure message208 to a user device 205 associated with the confirmed submission. Some examples of processes for evaluating the success of the email forwarding task are described below with reference to FIG. 3.

FIG. 3 illustrates an example validity evaluation process 320 that may be performed upon receiving an email message at the email address generated at block 112 of the process 100 as described with reference to FIG. 1. For example, at block 322 the process 320 may receive an email message at the generated email address. At block 324, the process 320 may obtain the email ID from the email address. At block 326, the process 320 may use the email ID to retrieve the session ID and the session URL from a server log. At block 328, the process 320 may search the received email message to determine whether the session URL associated with the email ID and/or the session ID is present in the email message (e.g., as plain text or in a hyperlink in markup language). If the session URL is found in the received email message (e.g., if block 330 results in a "yes" outcome), then the email message may be forwarded to a compliance evaluation email address at block 334, and a success message may be transmitted to the user device at block 336. If the session URL is not found in the received email message, then a failure message may be sent to the user device at block 332.

In some embodiments, the sending of a success message may also include sending an instruction (e.g., 209 in FIG. 2) to a request server (e.g., 220) instructing the request server to activate an incentive delivery process configured to deliver an incentive to the user. The incentive delivery process may include any process steps needed to fulfil a promised incentive. For example, if an offered incentive includes earning a chance to win an item of value, the incentive delivery process may comprise collecting user information necessary to fulfil a raffle entry (e.g., name, address, email address, or other contact information). In other embodiments, an email server may include instructions to automatically fulfil an incentive based on information collected from a "Sender" section (or other portions) of a forwarded email containing a valid session URL.

The validity evaluation process 320 may be configured to receive and evaluate a compliance email message sent to the generated email address. At block 322, the process 320 may receive an email message at the email address generated at block 112 of the process 100 in FIG. 1. The process 320 may obtain an email ID from the email address at block 324 and may retrieve a session ID and a session URL from a server log at block 326. At block 328, the process 320 may search the received email message for the session URL obtained from the server log.

If block 330 determines that the session URL is not found in the received email message, the process may indicate an error at block 332. If block 330 determines that the session URL is found in the received email message, the process may forward the received email message to a compliance evaluation email address at block 334, and may send a success message to a user device at block 336. The content of email messages sent to the compliance evaluation email address may be automatically or manually evaluated for compliance with applicable standards and/or requirements. For example, in some embodiments, compliance may be evaluated by comparing the forwarded email message with an approved email template. In some such cases, compliance may be established based on a degree to which the forwarded email matches the approved template.

In various embodiments, the process 320 of FIG. 3 may be performed by one or more of the same servers involved in the process 100 of FIG. 1, or by a separate server. Similarly, the user device to which a success message or an error message is sent may be the same user device that initiated a corresponding session in the process 100 of FIG. 1, or by a separate user device. In some cases, the separate user device may be operated by the same user who initiated the corresponding session.

In some embodiments, each generated email address may be given its own inbox. In such cases, receiving an email message may comprise receiving the email message in an inbox associated with the generated email address.

In some embodiments, emails sent to a plurality of generated email addresses may be forwarded or otherwise directed to a single inbox common to the plurality of generated email addresses. For example, generated email addresses may be created as aliases or forwarding addresses that may be configured to forward emails to an email address or inbox other than the one to which the email is directly addressed. The process 320 of FIG. 3 may then be performed on messages retrieved from a common inbox associated with a group of generated email addresses. For example, in various embodiments, an email server (e.g., 222 in FIG. 2) may include instructions for one or more processes configured to receive and evaluate email messages sent to one or more generated email addresses.

In some embodiments, an automated process may be configured to detect new messages in an email inbox and automatically process new email messages, such as by performing the steps described with reference to blocks 324-336.

The step of obtaining an email ID from the email address of the received email message may comprise identifying the email ID based on known information about the format of email addresses generated in the process of FIG. 1 as discussed in various examples above. The email address may be obtained from the recipient portion of the header section of the received email message. For example, if the email ID is known to be the entirety of the addressee portion of the generated email address, then the step at block 324 may comprise parsing the email address text to obtain only the addressee portion of the address. If the email ID is contained in another portion of the email address, the step at block 324 may obtain the email ID by parsing the email address text based on known rules.

In some embodiments, if the session ID is used as the email ID, then block 324 may comprise obtaining the session ID from the recipient email address section of the received email message header.

Retrieving session ID and the session URL from a server log of block 326 may comprise performing a database query using the email ID (or the session ID if the email ID and session ID are identical) as a criterion for retrieving the session URL associated with the request session during which the email address was created. The session URL may be temporarily or permanently stored in memory while the process 320 searches the email address for a text string matching the session URL.

In some embodiments, if the process 320 identifies a text string identically matching the session URL within the received email message, then the session URL may be said to be found (i.e., block 330 may return "yes"). In some embodiments, the session URL may be said to be not found (i.e., block 330 may return "no") if the process 320 fails to identify a text string identically matching the session URL within the received email message. Alternatively, the session URL may be said to be successfully found if the process identifies a string within the email message that is an inexact match, but close enough match with the session URL. For example, an inexact match may be close enough to be considered a match if the identified string is within a predetermined string distance of the session URL string as measured by a suitable string similarity metric such as Levenshtein distance or another metric. In other embodiments, an inexact match may be close enough to be considered a match if one or more predetermined portions of the strings match. In other embodiments, an inexact match may be determined to be a match based on any other suitable algorithm.

As shown at block 334, if the session URL is successfully found in the received email message, then the email message received at block 322 may be automatically forwarded to a compliance evaluation email address at which the email may be manually or automatically evaluated to assess its compliance with pre-determined standards.

In some embodiments, the step at block 336 may also send a success message to a user device indicating that the received email was successfully submitted. For example, an incentive offered to the user may be conditioned upon successful submission of the email that led the user to the compliance testing content. In such a case, a success message may contain instructions for any additional steps required for redeeming the incentive.

In some embodiments, the success message transmitted at block 336 may comprise an email transmitted to the email address indicated as the sender of the email message received at block 322. In some embodiments, the success message may comprise an SMS (short message service) message or an MMS (multimedia messaging service) message. In other embodiments, the success message may comprise a message transmitted over any other messaging protocol or other network communication protocol.

In some embodiments, if the session with the user device that initiated the compliance test is still active, the success message may comprise an HTTP response or a WAP action in the session associated with the session ID. For example, a text or graphic object presented along with the compliance test content may be updated to indicate successful receipt of the email message. In another example, the request server may present a user-interactive element on the user device. The user-interactive element may comprise one or more user input fields to allow a user operating the user device to input personal-identifying information in order to receive an offered incentive.

If the step at block 330 determines that the session URL is not found in the received email message, then the process may indicate an error at block 332. Indicating an error may comprise recording an entry in a log file indicating the failed email submission. Indicating an error may comprise sending a failure message to a user device indicating the failed email submission. In various embodiments, a failure message may be transmitted over any of the protocols discussed above with reference to block 336. In various embodiments, the email message may be discarded or stored in the event of a failure to identify the session URL in the message.

In various embodiments, the user device to which messages may be sent in blocks 336 and 332 may be the same device or a different device than user device 210 that sent session-initiating request in block 102 of FIG. 1. In some embodiments, a success message or a failure message may be sent via a protocol or to an address that is not specifically associated with any particular device but may be accessed by the original operator of the first user device (e.g., to an email address). In some embodiments, the success message or the failure message may be a reply email message sent to the email address indicated in the "From" field of the email message received at block 322.

Computing and Processing Devices

Figure 4:
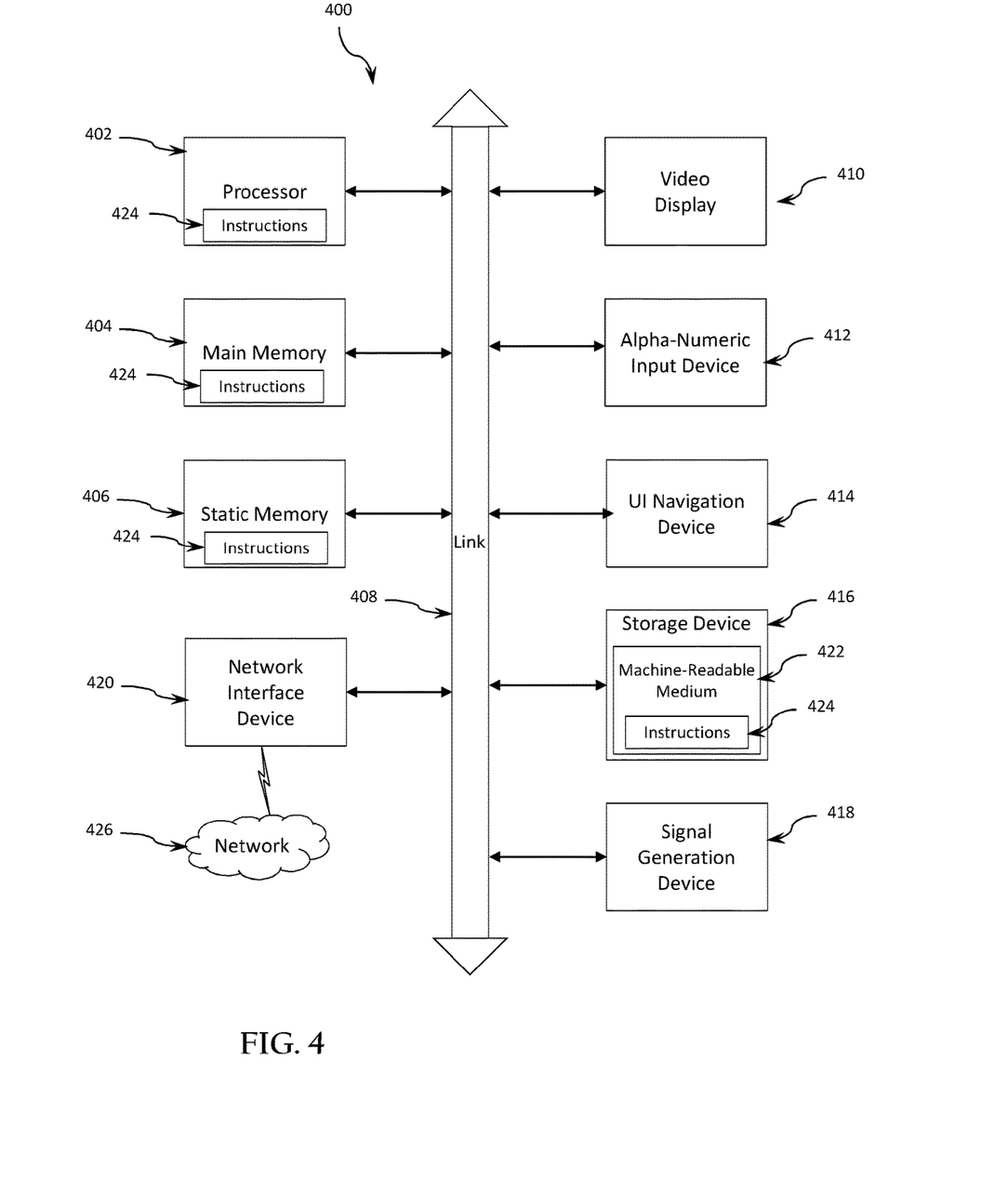
FIG. 4 is a block diagram of a machine in the example form of a computer system within which a set of instructions may be executed to cause the machine to perform any one or more of the methodologies discussed herein.

FIG. 4 is a block diagram illustrating a machine 400 in the example form of a computer system 400, within which one or more sets or sequences of instructions may be executed to cause the machine 400 to perform any one of the processes or methods described herein, according to various example embodiments. In some embodiments, a machine 400 such as that shown in FIG. 4 may operate as a standalone device or may be connected (e.g., networked) to other machines. In a networked deployment, a machine 400 may operate in the capacity of either a server or a client machine in server-client network environments, or a machine may act as a peer machine in peer-to-peer (or distributed) network environments.

The machine 400 may be a personal computer (PC), a laptop computer, a desktop computer, a server computer, a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. For example, in some cases, a single physical machine may be configured to operate as multiple virtual machines by separately allocating resources of a physical machine to multiple separate processes.

The example computer system 400 may include at least one processor 402 (e.g., a central processing unit (CPU), a graphics processing unit (GPU) or both, processor cores, compute nodes, etc.), a main memory 404 and a static memory 406, which may communicate with each other via a link 408 (e.g., bus). The computer system 400 may further include a video display unit 410, an alphanumeric input device 412 (e.g., a keyboard, touch screen, etc.), and a user interface (UI) navigation device 414 (e.g., a mouse, touch pad, touch screen, etc.). In one embodiment, the video display unit 410, input device 412 and UI navigation device 414 may be incorporated into a touch screen display.

The computer system 400 may additionally include one or more storage devices 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 (or devices) may include a machine-readable medium 422 on which may be stored one or more sets of data structures and instructions 424 (e.g., software) embodying or utilized by any one or more of the processes, modules, methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media. In various embodiments, instructions for separate modules or processes may be stored in storage regions on the one or more storage devices. Additionally, data stores, in the form of databases or other collections of data may also be stored in storage regions on the one or more storage devices. Storage regions may be physically contiguous or non-contiguous on the one or more storage devices, may be any size as needed, and may use any file management system, database management system, or data management system as desired.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP, WAP, etc.). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any tangible or intangible medium that is capable of storing, encoding, or carrying instructions for execution by the machine, and includes digital or analog communications signals or other medium to facilitate communication of such software.

Any of the devices (e.g., user devices), modules, data stores, servers, or other computing systems described in the various embodiments herein may include some or all elements of the machine 400 illustrated in FIG. 4 and described herein. For example, any or all of the elements described herein with reference to FIG. 2 may be implemented as complete physical machines or as virtual machines in one or more machines 300. Such elements may include the user devices 210, the mailer 205, the request server 220 or other devices containing instructions or otherwise used to perform one or more processes according to one or more of the example embodiments described herein.

Certain Terminology

The present disclosure should not be limited to the illustrated orientation. Indeed, other orientations are possible and are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may indicate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may indicate, the term "generally parallel" can refer to something that departs from exactly parallel by less than or equal to 20 degrees and the term "generally perpendicular" can refer to something that departs from exactly perpendicular by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Although compliance testing systems and methods have been disclosed in the context of certain preferred embodiments and examples, it will be understood by those skilled in the art that this disclosure extends beyond the specifically disclosed embodiments to other alternative embodiments and/or uses of the systems and methods and obvious modifications and equivalents thereof. For example, various aspects of compliance testing systems and methods may also be used in automated testing in fields other than advertising.

Various modifications to the above embodiments will be readily apparent to those skilled in the art, and the principles described herein may be applied to other embodiments without departing from the spirit or scope of this disclosure. Thus, it is intended that the scope of this disclosure should not be limited by the particular disclosed embodiments described. Various features and aspects of the disclosed embodiments can be combined with or substituted for one another in order to form varying modes of the compliance testing systems and methods. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination. Further, the claims may be drafted to exclude any disclosed element. As such, the foregoing sentence is intended to serve as antecedent basis for use of such exclusive terminology as "solely," "only" and the like in connection with the recitation of claim elements, or use of a "negative" limitation.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of compliance testing systems and methods have been disclosed. Although the compliance testing systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

What is claimed is:

1. An advertisement email compliance method comprising:
   receiving a first electronic request from a first user device for a first advertisement content, the advertisement content corresponding to a first session uniform resource locator (URL);
   assigning a first session identifier to the user device, the session identifier identifying a session initiated by the first electronic request;
   storing first digital data in a server log, the first digital data comprising the first session URL from the first electronic request and the first session identifier;
   generating a first email address containing a first email identifier and associating the first email identifier with the first session identifier in the server log; and
   presenting the user device with compliance test content instead of the requested first advertisement content, the compliance test content including a presentation of the generated first email address and instructions to forward an email message containing the first session URL to the generated first email address.

2. The method of claim 1, further comprising:
   receiving a first compliance email message at the generated first email address;
   obtaining the first email identifier from a portion of a recipient email address in a header of the received first compliance email message;
   using the first email identifier to retrieve the first session identifier from the server log;
   using the first session identifier to retrieve the first session URL from the server log;
   searching the first compliance email message for a string matching the first session URL;
   identifying a string matching the first session URL in the received first compliance email message, and forwarding the first compliance email message to a compliance evaluation email address.

3. The method of claim 2, wherein the first session URL in the received first compliance email message is contained in a hyperlink.

4. The method of claim 2, wherein the string matching the first session URL is an inexact match.

5. The method of claim 2, further comprising receiving the forwarded first compliance email message at the compliance evaluation email address, and automatically comparing content of the forwarded first compliance email message with an approved email template.

6. The method of claim 2, further comprising sending a success message to a user device based on identifying a string matching the first session URL n the received first compliance email message.

7. The method of claim 2, further comprising:
   receiving a second compliance email message at the generated first email address;
   obtaining the first session identifier from a portion of a recipient email address in a header of the received second compliance email message;
   using the first session identifier to retrieve the first session URL from the server log;
   searching the second compliance email message for a string matching the session URL;
   determining that the second compliance email message does not contain a string matching the first session URL, and sending a failure message to a user device after determining that a string matching the first session URL is not found in the received second compliance email message.

8. The method of claim 1, further comprising identifying an advertisement campaign associated with the first session URL and storing data associating the advertisement campaign with the first session identifier.

9. The method of claim 1, further comprising storing second digital data associating the generated email address with the session identifier.

10. The method of claim 1, further comprising identifying an advertising campaign associated with the first session URL, obtaining a test rate associated with the campaign, and directing the first user device to the compliance test content based on the test rate.

11. The method of claim 1, wherein the electronic request is an hypertext transfer protocol (HTTP) request.

12. The method of claim 1, wherein the electronic request is a wireless access protocol (WAP) request.

13. The method of claim 1, wherein presentation of the generated first email address comprises displaying the generated first email address as text.

14. The method of claim 1, wherein presentation of the generated first email address comprises providing the generated first email address in a control object.

15. The method of claim 1, wherein the first session identifier uniquely identifies the session initiated by the first electronic request and the first email identifier is uniquely associated with the first session identifier.

16. A method of verifying a compliance email, comprising:
receiving a first email message;
obtaining, from the first email message, a generated email address to which the email message was sent;
obtaining a first session identifier from a portion of the generated email address in a header of the received compliance email message;
using the first session identifier to retrieve a session uniform resource locator (URL) from a server log;
searching the received first email message for a string matching the session URL; and
based on identifying a string matching the session URL in the received first email message, forwarding the first received email message to a compliance evaluation email address.

17. The method of claim 16, wherein the session URL in the received first email message is contained in a hyperlink.

18. The method of claim 16, wherein the string in the first received email message matching the session URL is an inexact match.

19. The method of claim 16, further comprising receiving the forwarded first email message at the compliance evaluation email address, and automatically comparing content of the forwarded first email message with an approved email template.

20. The method of claim 16, further comprising sending a success message to a user device after identifying a string matching the session URL in the received first email message.

21. The method of claim 20, further comprising sending an incentive fulfilment instruction to a request server.

22. The method of claim 16, further comprising:
receiving a second email message;
obtaining, from the second email message, a generated email address to which the email message was sent;
obtaining a first session identifier from a portion of the generated email address in a header of the received compliance email message;
using the first session identifier to retrieve a session URL from a server log;
searching the received second email message for a string matching the session URL;
determining that no string matching the session URL is found in the received second compliance email message; and
sending a failure message to a user device after determining that a string matching the session URL is not found in the received email message.

23. An email compliance testing system comprising:
at least one processor;
at least one data storage device with a plurality of storage sections;
a first storage section of the at least one data storage device having email compliance testing process instructions stored therein, wherein the email compliance testing process instructions, when executed by the at least one processor, configure the at least one processor to:
receive a first electronic request from a first user device for a first advertisement content, the advertisement content corresponding to a first session URL;
assign a first session identifier to the user device, the session identifier identifying a session initiated by the first electronic request;
store first digital data in a server log, the first digital data comprising a first session uniform resource locator (URL) from the first electronic request and the first session identifier;
generate a first email address containing a first email identifier and associate the first email identifier with the first session identifier;
present the user device with compliance test content instead of the requested first advertisement content, the compliance test content including a presentation of the generated first email address.

24. The system of claim 23, further comprising a second storage section of the at least one data storage device having validity evaluation process instructions stored therein, wherein the validity evaluation process instructions, when executed by the at least one processor configure the at least one processor to:
receive a first compliance email message at the generated first email address;
obtain the first session identifier from a portion of a recipient email address in a header of the received compliance email message;
use the first session identifier to retrieve the first session URL from the server log;
search the first compliance email message for a string matching the first session URL; and
forward the first compliance email message to a compliance evaluation email address after identifying a string matching the first session URL in the received first compliance email message.

25. The system of claim 24, wherein the validity evaluation process instructions, when executed by the at least one processor further configure the at least one processor to send a success message to the user device after identifying the string matching the first session URL in the received first compliance email message.

26. The system of claim 24, wherein the wherein the validity evaluation process instructions, when executed by the at least one processor further configure the at least one processor to receive a second compliance email message at the generated first email address;
obtain the first session identifier from a portion of a recipient email address in a header of the received second compliance email message;
use the first session identifier to retrieve the first session URL from the server log;
search the second compliance email message for a string matching the first session URL; and
send a failure message to the user device after determining that the first session URL is not found in the received second compliance email message.

* * * * *

UNITED STATES PATENT AND TRADEMARK OFFICE
CERTIFICATE OF CORRECTION

| | | |
|---|---|---|
| PATENT NO. | : 10,528,976 B1 | Page 1 of 1 |
| APPLICATION NO. | : 15/050113 | |
| DATED | : January 7, 2020 | |
| INVENTOR(S) | : Fries et al. | |

It is certified that error appears in the above-identified patent and that said Letters Patent is hereby corrected as shown below:

In the Claims

Column 18, Line 34, Claim 6, delete "n" and insert --in-- therefor

Column 20, Line 48, Claim 26, delete "wherein the wherein the" and insert --wherein the-- therefor Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*